United States Patent [19]

Ive

[11] Patent Number: 4,470,142
[45] Date of Patent: Sep. 4, 1984

[54] DATA PROCESSING

[75] Inventor: John G. S. Ive, London, England

[73] Assignee: Sony Corporation, Tokyo, Japan

[21] Appl. No.: 354,713

[22] Filed: Mar. 4, 1982

[30] Foreign Application Priority Data

Mar. 11, 1981 [GB] United Kingdom ................. 8107602

[51] Int. Cl.³ .............................................. G06F 7/22
[52] U.S. Cl. ......................................... 371/2; 358/339
[58] Field of Search ............... 371/40, 38, 2; 358/314, 358/327, 336, 339

[56] References Cited

U.S. PATENT DOCUMENTS

| | | | |
|---|---|---|---|
| 3,585,586 | 6/1971 | Harmon et al. | 371/2 |
| 3,657,699 | 4/1972 | Rocher et al. | 371/2 |
| 4,041,453 | 8/1977 | Umeda et al. | 371/2 |
| 4,394,642 | 7/1983 | Currie et al. | 371/40 |
| 4,400,810 | 8/1983 | Ive | 371/40 |

Primary Examiner—Charles E. Atkinson
Attorney, Agent, or Firm—Lewis H. Eslinger; Alvin Sinderbrand

[57] ABSTRACT

Blocks of data, each representing ninety-six lines of a digital television signal are subjected to horizontal shuffling within each line and then to vertical shuffling within each block. The effect of the vertical shuffling is to displace sample words to different lines so that in the event of errors occurring during recording and reproduction in a video tape recorder, valid sample words are available adjacent to any error sample word for the purpose of error concealment. The vertical shuffling does not interfere with vertical parity generation or with the correction of errors after reproduction using the vertical parity words.

11 Claims, 3 Drawing Figures

DATA PROCESSING

BACKGROUND OF THE INVENTION

1. Field of the Invention

This invention relates to data processing, and more particularly, but not exclusively, to methods and apparatuses for shuffling and subsequently de-shuffling digital data representing a television signal, for the purpose of making it easier to conceal errors.

2. Description of the Prior Art

There is increasing interest in the digitizing of television signals, for example, for the purpose of recording with a digital video tape recorder (VTR). To effect digitization, the composite analog video signal or component analog video signals is sampled at regular intervals along each horizontal scan line and the resulting sample values are coded into binary digital form. Then, on reproduction of the digital signal from the digital VTR, a replica of the original analog video signal can be formed.

The digital signal which is recorded comprises data words corresponding to the analog video signal samples and further words or at least bits to identify the digital signal generally, for example by time or subject, to identify the horizontal lines and fields to which the samples belong, and to enable horizontal and vertical synchronizing signals and color burst signals to be added back to the analog video signal to make a complete reproduced television signal. So far as the parts of the digital signal corresponding to the samples are concerned, if reproduction of the recorded video signal was always perfect, then these parts of the digital signal could, for example, be in the form of 8-bit words, each word representing a respective sample, and sequential words representing sequential samples along the horizontal line. In practice of course the reproduced signal is commonly less than perfect, with the result that individual bits or whole words are corrupted and, in the case of drop-out, whole sequences of words are lost completely. Errors like this are clearly detrimental to the reproduced television picture, and steps must therefore be taken to reduce the effects of such errors.

The two techniques used are error correction and error concealment. In error correction, data words which contain errors are identified and the errors corrected. To do this, additional bits are recorded simply to make provision for error correction. This increases the amount of information to be handled and increases the already high data rates, so a compromise is necessary between the number of bits added for error correction purposes and the degree of error correction achieved. One proposal is to recode each 8-bit digital word as a corresponding 10-bit digital word. By using only those 10-bit words which have substantially equal numbers of "0"s and "1"s and in which long runs of either digit are absent, the digital signal can be made more suited to the recording characteristics of magnetic tape, and the recovery of the bit rate clock frequency from the reproduced digital signal can be made easier. However, for error correction, the important point is that the additional bits enable some error words to be recognized as such.

Having so far as possible effected correction, there remains the problem of words which although recognized to be in error cannot be corrected. This can occur for example where there is a drop-out. These errors are concealed. Various concealment techniques have been proposed, but generally they rely on the availability of words corresponding to samples adjacent to the sample corresponding to the word which is in error or has been lost. As a very simple example, consider three successive samples along a horizontal line. If the word corresponding to the middle sample is in error or has been lost, a reasonable approximation to the correct sample can be made by taking the average of the samples on either side.

Unfortunately, however, error words or lost words are very likely to occur in bursts of successive words, rather than as single words. Indeed, in some error correction techniques when a word is found to be in error it is automatically assumed that several words on either side of the error word are also in error, even although they have not been positively identified as being in error. So long as the data words are recorded in the natural sequence corresponding to successive samples and horizontal lines, therefore, the use of concealment techniques is likely to be hampered by the lack of adjacent or at least near-by correct words.

To get over this problem, it has been proposed to shuffle the order of the digital words prior to recording and to de-shuffle the order after reproduction so dispersing any error words, but it is necessary to do this without unacceptably increasing the amount of or the complexity of the data handling apparatus.

SUMMARY OF THE INVENTION

One object of the present invention is to provide a method of shuffling a block of data in a relatively simple manner.

Another object of the present invention is to provide a method of shuffling a block of data representing a television signal without affecting vertical parity correction.

Another object of the present invention is to provide apparatus for shuffling a block of data to disperse adjacent data words.

Another object of the present invention is to provide apparatus for shuffling a block of data representing a television signal to disperse words which may be in error and without affecting vertical parity checking.

According to the present invention there is provided a method of shuffling a block of data consisting of data words each having an address representing in which of a plurality of lines of data words making up said block said data word is located and also the position of said data word in said line, by allocating to each said data word a new address in which the line of the original address is changed to a new line by successively adding the same number to the original line number of successive samples along each said line and in which the position of said data word relative to other data words in the original line is unchanged.

According to the present invention there is also provided a method of shuffling a block of data consisting of 96 lines consecutively numbered from 0 to 95 and each consisting of 512 words consecutively numbered from 0 to 511 to addresses in first, second, third and fourth 96-line by 127-word stores, the method comprising:

allocating the xth word in each line to the first, second, third and fourth stores in dependence on whether the residual on dividing x by four is zero, one, two or three, respectively;

in each line of each of the first, second, third and fourth stores numbering the incoming words consecutively from 0 to 126;

in the first store allocating the x'th word in each line to a new line $25y+24x'$;

in the second store allocating the x'th word in each line to a new line $6+25y+24x'$;

in the third store allocating the x'th word in each line to a new line $12+25y+24x'$; and in the fourth store allocating the x'th word in each line to a new line $18+25y+24x'$;

where in each case y is the original line number and the addition is modulo-96.

According to the present invention there is also provided apparatus for shuffling a block of data consisting of data words each having an address representing in which of a plurality of lines data words making up said block said data word is located and also the position of said data word in said line, the apparatus comprising means for allocating to each said data word a new address in which the line of the original address is changed to a new line by successively adding the same number to the original line number of successive samples along each said line and in which the position of said data word relative to other data words in the original line is unchanged.

According to the present invention there is also provided apparatus for shuffling a block of data consisting of 96 lines consecutively numbered from 0 to 95 and each consisting of 512 words consecutively numbered from 0 to 511, the apparatus comprising first, second, third and fourth 96-line by 127-word stores;

means for allocating the xth word in each line to the first, second, third and fourth store in dependence on whether the residual on dividing x by four is zero, one, two or three, respectively;

in each line of each of the first, second third and fourth stores the incoming words being numbered consecutively from 0 to 126;

means associated with the first store for allocating the x'th word in each line to a new line $25y+24x'$;

means associated with the second store for allocating the x'th word in each line to a new line $6+25y+24x'$;

means associated with the third store for allocating the x'th word in each line to a new line $12+25y+24x'$; and means associated with the fourth store for allocating the x'th word in each line to a new line $18+25y+24x'$;

where in each case y is the original line number and the addition is modulo-96.

Methods and apparatuses according to the invention can be used even in cases where vertical parity words are to be generated.

The above, and other objects, features and advantages of this invention will be apparent from the following detailed description of illustrative embodiments which is to be read in connection with the accompanying drawings.

DESCRIPTION OF THE PREFERRED EMBODIMENTS

The embodiment to be described is for shuffling the order of the words of a digital signal corresponding to a television signal, which digital signal is to be recorded by a VTR, and for de-shuffling the order of the words after reproduction by the VTR.

Only the active fields of video information are recorded, that is, horizontal and vertical synchronizing information and color burst signals are omitted in recording, and are added back after reproduction. Each active field consists of 288 horizontal lines in a 625-line PAL television system, although it will be apparent that the invention can readily be applied to different television systems and to different numbers of horizontal lines in a field. For recording, each field is divided into three equal segments consisting of the top, centre and bottom 96 lines, so that the recorded digital signal is made up of three 96-line blocks per field. The digital words are shuffled within each 96-line block. The VTR used records each field as three skew tracks on a magnetic tape, so that each 96-line block occupies one skew track, and moreover the shuffling can be such as to spread the words of a horizontal line over one complete helical scan of the VTR, that is one complete skew track extending from near one edge to near the other edge of the magnetic tape. This reduces the likelihood of a sequence of adjacent words from the same horizontal line being corrupted or lost. Obviously division of the fields into blocks consisting of other numbers of horizontal lines may be more advantageous with VTRs using other recording formats.

It will be assumed that each horizontal line comprises 512 samples, and this means that each 96-line block comprises $96 \times 512$ samples. While a program could easily be written to shuffle $96 \times 512$ samples in a predetermined random manner, its implementation would require an excessive amount of hardware. The embodiment to be described therefore uses an addressing algorithm. Each data word is a 10-bit word which corresponds to an original 8-bit word, the conversion to 10bit words being performed in the general manner and for the reasons outlined above. This provides a good probability of error detection after reproduction. Provision for error correction is made by generating vertical parity words after the shuffling and before recording, and applying a parity check based on these parity words after reproduction and vertical de-shuffling. This imposes some limitations on the shuffling that can be done. Finally, it is assumed that the VTR used is a 2-head device, so the digital signal is demodulated into two channels, but the embodiment to be described can readily be modified for use, for example with a 4-head device.

Figure 1:
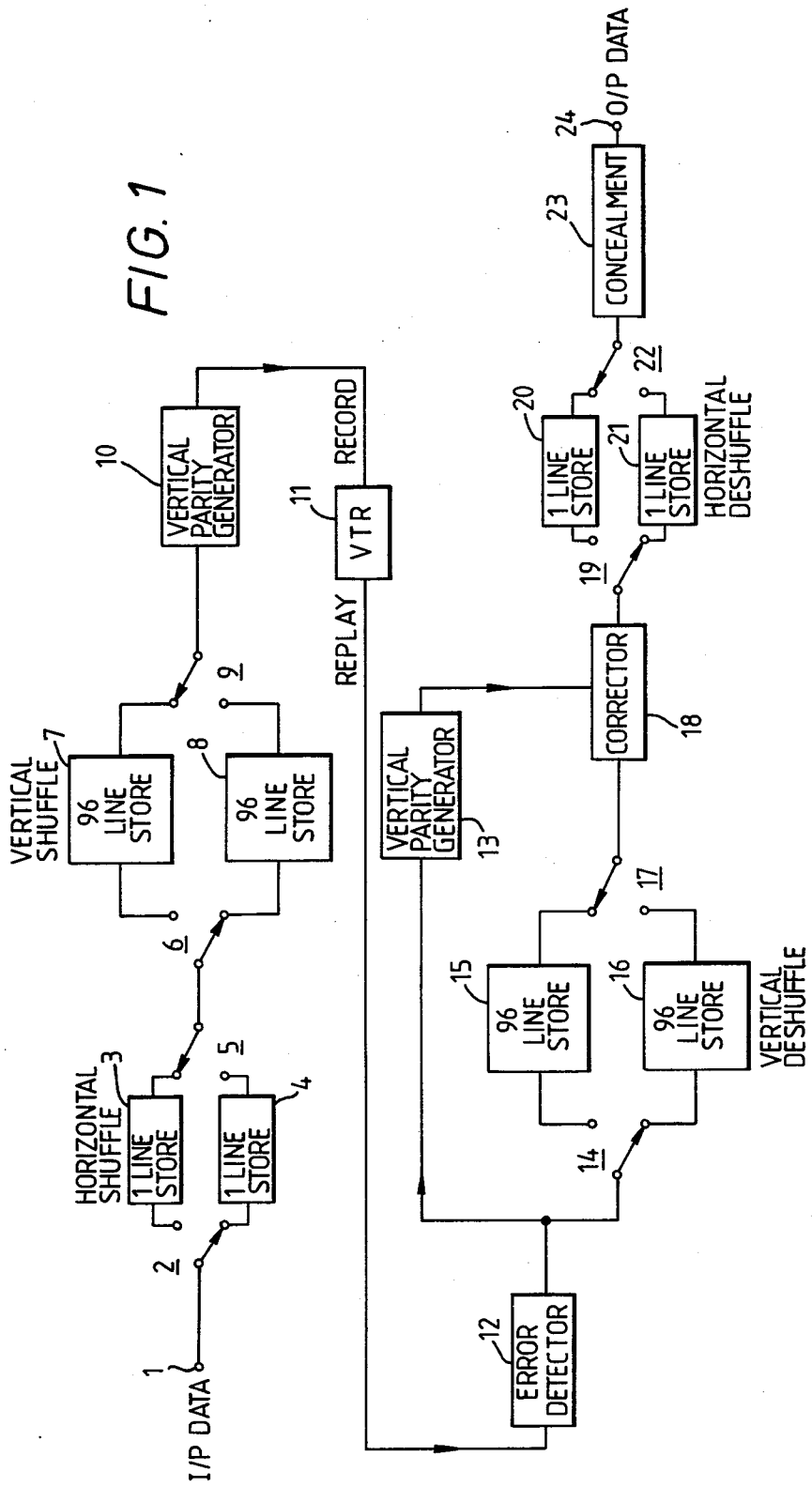
FIG. 1 shows a digital television signal processing apparatus in which an embodiment of the invention is used.

Referring now to FIG. 1, this shows in block form the main parts of a recording and reproducing system in which shuffling and de-shuffling is performed. Input data comprising 10-bit words corresponding to successive samples along successive horizontal lines of successive fields of a television signal are supplied by way of an input terminal 1 to an electronic switch 2 which supplies alternate horizontal lines to 1-line stores 3 and 4 respectively where shuffling of the words in each horizontal line is effected according to a predetermined program. Such horizontal shuffling has been previously proposed and will not therefore be described in detail here.

Outputs are derived from the stores 3 and 4 by way of an electronic switch 5 and are supplied by way of an electronic switch 6 which supplies alternate blocks of 96 lines of the input data to 96-line stores 7 and 8 where vertical shuffling is performed in a manner described in detail below. Outputs consisting of 96-line blocks are derived alternately from the stores 7 and 8 by way of an electronic switch 9 and are supplied by way of a vertical parity generator 10 to a VTR 11 for recording.

On reproduction from the VTR 11, the reproduced data words are supplied to an error detector 12 which detects invalid data words. The data words are then supplied to a vertical parity generator 13 and also by way of an electronic switch 14 which supplies alternate 96-line blocks to 96-line stores 15 and 16, in which vertical de-shuffling is performed. Outputs are derived alternately from the stores 15 and 16 by way of an electronic switch 17 and supplied to a data word corrector 18 to which the vertical parity generator 13 is also connected. After correction of the data words using the vertical parity, alternate horizontal lines are supplied by an electronic switch 19 to 1-line stores 20 and 21 respectively in which horizontal deshuffling is performed. Outputs are derived alternately from the stores 20 and 21 by an electronic switch 22 and supplied to a concealment device 23, where concealment of data words in error is performed, and thence to an output terminal 24.

Figure 2:
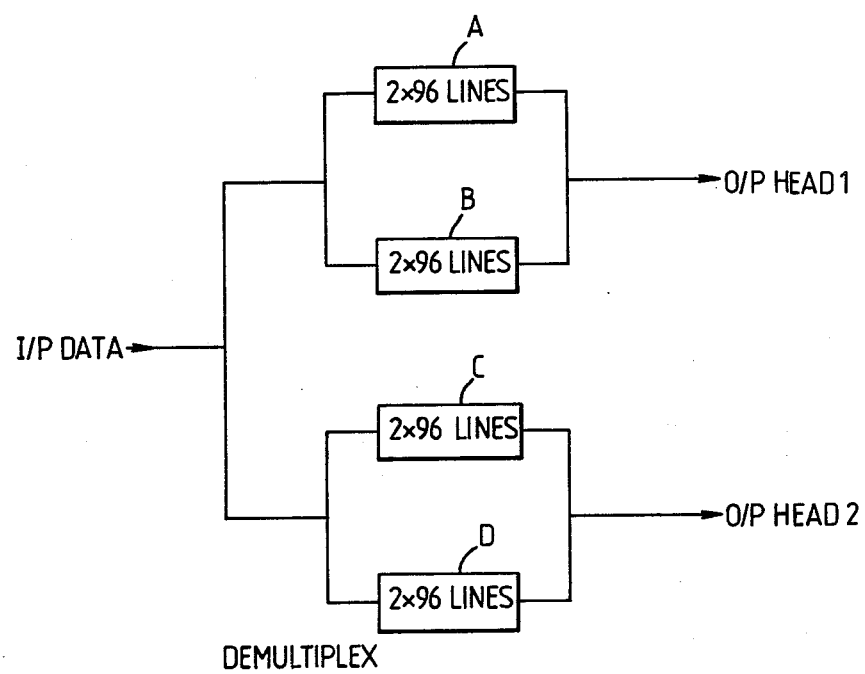
FIG. 2 shows a part of the apparatus of FIG. 1 in more detail.

While FIG. 1 shows the general organization of the system, it will be apparent that in order to enable the data to be handled at convenient speeds, it is desirable to introduce some demultiplexing. FIG. 2, to which reference is now made shows, in part and in very simplified form, how this can be done for the stores 7 and 8 of FIG. 1. In FIG. 2 the necessary electronic switches are not shown. The input data derived from the stores 3 and 4 of FIG. 1 by the switch 5 of FIG. 1 are demultiplexed into four ways so as to be supplied to four similar stores A, B, C and D respectively. Each store A, B, C and D comprises two 96-line stores and may therefore be thought of as corresponding to the stores 7 and 8 but only handling the data at one quarter the speed, due to the 4-way demultiplexing. Moreover, each of the eight 96-line stores which make up the store A, B, C and D is only required to store 96×127 data words (512 divided by 4), but two such 96-line stores are required in each store A, B, C and D due to the necessity of separating the read and write functions.

In the case of a 2-head VTR, the outputs of the stores A and B, and of the stores C and D are multiplexed for supply to the head 1 and the head 2 respectively. To effect this, outputs are derived for example, from the four 96-line stores which make up the stores A and B, with successive quarter-line offsets, to form the output for supply to the head 1. The technique can be modified as appropriate for VTRs with other numbers of heads, such as one or four.

The manner in which words are allocated to stores in order to achieve the required demultiplexing and vertical shuffling will now be described with reference also to Tables 1 and 2. Only writing in the stores A, B, C and D is being considered at the moment, so each can be considered as a single 96-line by 127-word store.

TABLE 1

| Input samples allocated to the four stores A, B, C and D as follows, by demultiplexing: | | | | | |
|---|---|---|---|---|---|
| A | 0 | 4 | 8 | 12 | 16 | etc |
| B | 2 | 6 | 10 | 14 | 18 | " |
| C | 1 | 5 | 9 | 13 | 17 | " |
| D | 3 | 7 | 11 | 15 | 19 | " |

Referring first to Table 1, consider the successive input samples numbered 0 to 511 (these numbers relate to the order of the samples subsequent to the horizontal shuffling) of a single horizontal line. The sample 0 goes to store A, the sample 1 goes to the store C, the sample 2 goes to the store B, and the sample 3 goes to the store D. This cyclic allocation then repeats until all 512 samples are stored; 127 samples in each of the stores A, B, C and D. Reference also to FIG. 2 will show that by allocating successive samples to one of the stores A and B, and to one of the stores C and D in this way results in successive samples being supplied to the heads 1 and 2 alternately.

TABLE 2

| For the line 0 these samples are allocated to the following lines: | | | | | |
|---|---|---|---|---|---|
| A | 0 | 24 | 48 | 72 | 0 | etc |
| B | 12 | 36 | 60 | 84 | 12 | " |
| C | 6 | 30 | 54 | 78 | 6 | " |
| D | 18 | 42 | 66 | 90 | 18 | " |

Referring now to Table 2, this shows how the samples of the line 0 of a 96-line block are allocated to lines in the stores A, B, C and D, but first it should be emphasized that we are here only concerned with vertical shuffling, that is in changing the line to which a sample is allocated, and not in changing the order of the demultiplexed samples belonging to any one line. Thus, for the line 0 each successive sample going to the store A has a further 24 added to the line to which the sample is allocated, so the line allocations are successively 0, 24, 48, 72, 0, 24, .... As the store A is a 96-line store, the addition of 24 to 72 brings the next line allocation to the line 0 (and not to the line 96, which does not exist), in other words the addition used is modulo-96 addition whereby no addition can result in an answer larger than 95.

The rules are basically the same for the other stores B, C and D, with the exception that the respective stores have off-sets of 12, 6 and 18 lines relative to the store A.

One other modification to these rules is necessary in order to provide spacially close samples for concealment on the line 0; this is the addition of a further 24, again using modulo-96 addition, to each successive line number. Thus the first sample of the line 1 goes not to the line 1, but to line 25 (1+24), and the second sample of the line 1 goes not to the line 13 (1+offset of 12), but to the line 37 (1+24+offset of 12).

Table 3, to which reference is now made, shows the reallocation of samples for the first eight lines.

TABLE 3

| Line 0 | A | 0 | 24 | 48 | 72 | 0 |
| | B | 12 | 36 | 60 | 84 | |
| | C | 6 | 30 | 54 | 78 | |
| | D | 18 | 42 | 66 | 90 | |
| Line 1 | A | 25 | 49 | 73 | 1 | |
| | B | 37 | 61 | 85 | 13 | |
| | C | 31 | 55 | 79 | 7 | |
| | D | 43 | 67 | 91 | 19 | |

TABLE 3-continued

| Line | | | | | |
|---|---|---|---|---|---|
| Line 2 | A | 50 | 74 | 2 | 26 |
| | B | 62 | 86 | 14 | 38 |
| | C | 56 | 80 | 8 | 32 |
| | D | 68 | 92 | 20 | 44 |
| Line 3 | A | 75 | 3 | 27 | 51 |
| | B | 87 | 15 | 39 | 63 |
| | C | 81 | 9 | 33 | 57 |
| | D | 93 | 21 | 45 | 69 |
| Line 4 | A | 4 | 28 | 52 | 76 |
| | B | 16 | 40 | 64 | 88 |
| | C | 10 | 34 | 58 | 82 |
| | D | 22 | 46 | 70 | 94 |
| Line 5 | A | 29 | 53 | 77 | 5 |
| | B | 41 | 65 | 89 | 17 |
| | C | 35 | 59 | 83 | 11 |
| | D | 47 | 71 | 95 | 23 |
| Line 6 | A | 54 | 78 | 6 | 30 |
| | B | 66 | 90 | 18 | 42 |
| | C | 60 | 84 | 12 | 36 |
| | D | 72 | 0 | 24 | 48 |
| Line 7 | A | 79 | 7 | 31 | 55 |
| | B | 91 | 19 | 43 | 67 |
| | C | 85 | 13 | 37 | 61 |
| | D | 1 | 25 | 49 | 73 |

Thus, for example, the first sample of the line 0 allocated to the store A goes to the line 0, the second sample of the line allocated to the store A is moved to the line 24, the third sample of the line 0 allocated to the store A is moved to the line 48, the fourth sample of the line 0 allocated to the store A is moved to the line 72, the fifth sample of the line 0 allocated to the store A goes to the line 0, and so on. The first sample of the line 1 allocated to the store B is moved to the line 37, the second sample of the line 1 allocated to the store B is moved to the line 61, and so on; the first sample of the line 2 allocated to the store C is moved to the line 56, the second sample of the line 2 allocated to the store C is moved to the line 80, and so on; and the first sample of the line 3 allocated to the store D is moved to the line 93, the second sample of the line 3 allocated to the store D is moved to the line 21, and so on.

Putting it more generally, in allocating a block of 96 lines, consecutively numbered from 0 to 95, and each consisting of 512 words, consecutively numbered from 0 to 511, to addresses in four 96-line by 127-word stores, numbered 1 to 4, the rules are:

1. The xth word in each line is allocated to the store 1, 2, 3 or 4 in dependence on whether the residual on dividing x by four is zero, one, two or three, respectively.
2. In each line of each of the stores 1, 2, 3 and 4 the incoming words are consecutively numbered from 0 to 126.
3. In the store 1 (the store A in the above example) the x'th word in each line is allocated to a new line $25y + 24x'$, where y is the original line number and the addition is modulo-96.
4. In the store 2 (the store C in the above example) the x'th word in each line is allocated to a new line $6 + 25y + 24x'$, where y is the original line number and the addition is modulo-96.
5. In the store 3 (the store B in the above example) the x'th word in each line is allocated to a new line $12 + 25y + 24x'$, where y is the original line number and the addition is modulo-96.
6. In the store 4 (the store D in the above example) the x'the word in each line is allocated to a new line $18 + 25y + 24x'$, where y is the original line number and the addition is modulo-96.

To implement these rules requires knowledge of the position of the sample within a group of four samples in the line, and depending on this position, 0, 24, 48 or 72 is added to the line number, together with the fixed offset of 0, 6, 12 or 18 depending on the store to which the sample is allocated. These operations are all basic arithmetical operations and are modified only by the use of modulo-96 addition.

Table 4, then re-maps part of the allocation to show the position of samples which initially were adjacent to the sample 8 in the line 8, this having become the ringed sample 8 in the line 56.

TABLE 4

| | | | | | | | | | | | | | | |
|---|---|---|---|---|---|---|---|---|---|---|---|---|---|---|
| Line 4 | | | | | 28 | 34 | 40 | 46 | (52) | (58) | 64 | 70 | 76 | |
| Line 5 | | | | 47 | (53) | (59) | 65 | 71 | 77 | 83 | 89 | 95 | 5 | 11 |
| Line 6 | | | 66 | 72 | 78 | 84 | 90 | 0 | 6 | 12 | 18 | 24 | 30 | 36 | 42 |
| Line 7 | | 85 | 91 | 1 | 7 | 13 | 19 | 25 | 31 | 37 | 43 | 49 | (55) | (61) | 67 | 73 |
| Line 8 | 8 | 14 | 20 | 26 | 32 | 38 | 44 | 50 | (56) | 62 | 68 | 74 | 80 | 86 | 92 | 2 |
| Line 9 | | 39 | 45 | (51) | (57) | 63 | 69 | 75 | 81 | 87 | 93 | 3 | 9 | 15 | 21 |
| Line 10 | | | 70 | 76 | 82 | 88 | 94 | 4 | 10 | 16 | 22 | 28 | 34 | 40 |
| Line 11 | | | | 5 | 11 | 17 | 23 | 29 | 35 | 41 | 47 | (53) | (59) |
| Line 12 | | | | | 36 | 42 | 40 | (54) | (60) | | 66 | 72 | 78 |

In Table 4 the samples which are less than six lines dispersed in time are also ringed, and it will be seen that the dispersion is wide enough to ensure that ample adjacent samples are available for concealment purposes.

Figure 3:
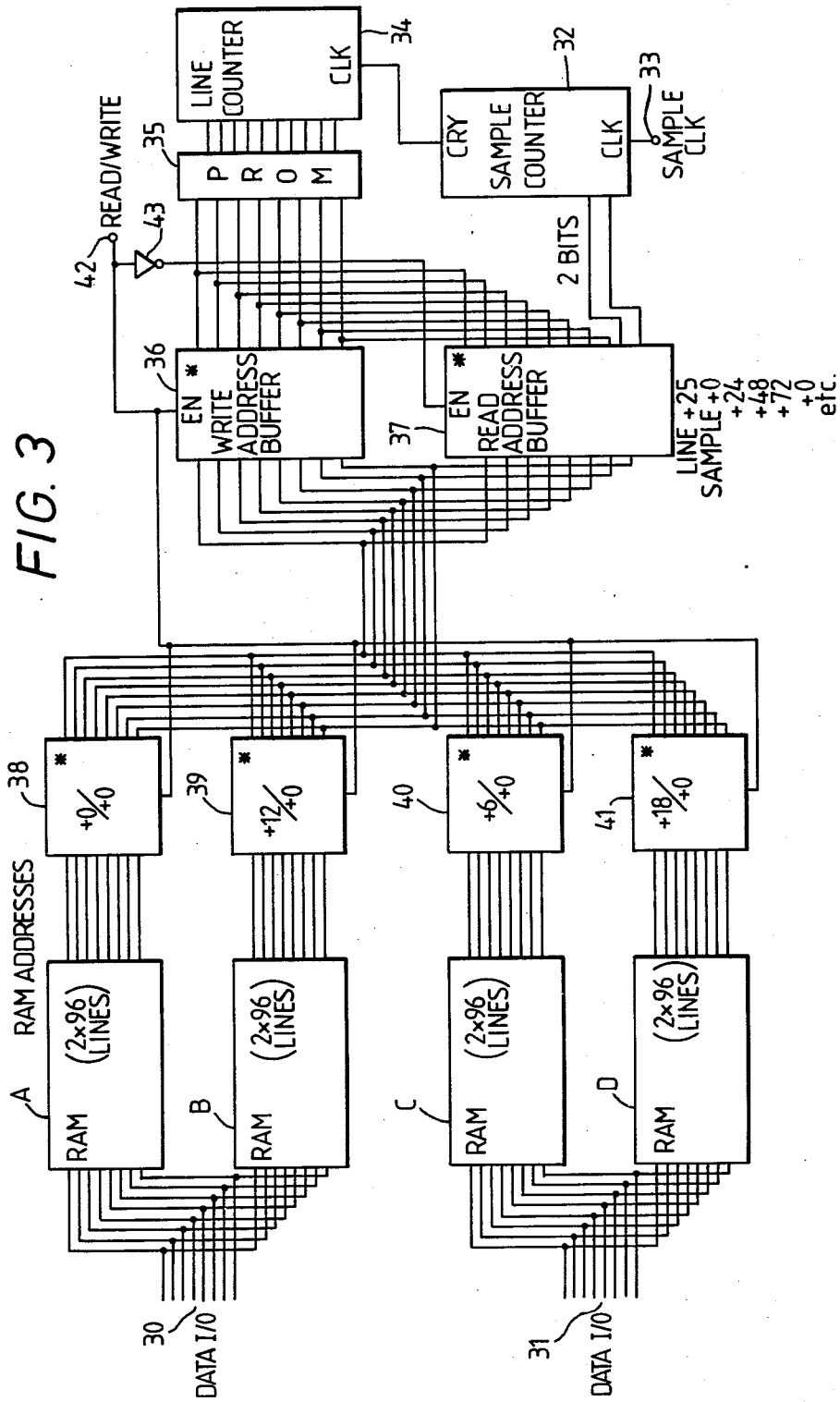
FIG. 3 shows a part of the apparatus of FIG. 1 in still more detail.

Reference will now be made to FIG. 3 which shows in more detail an example of apparatus for effecting data processing in accordance with the above rules. Each of the stores A, B, C and D of FIG. 2 is a 2 by 96-line (or more precisely 2 by 96×127 word, as each store receives only a quarter of the samples of each line) random access memory (RAM). The RAMs A and B have a common data input/output 30, and the RAMs C and D have a common data input/output 31, each of these allowing the input and output of parallel 8-bit words to and from selected addresses in the respective RAMs A and B, or C and D.

The apparatus also includes a sample counter 32 which counts sample-rate clock pulses supplied to an imput terminal 33 and on counting to 127 (0 to 126) supplies a carry signal to a clock terminal of a line counter 34. The line counter 34 counts to 192 (0 to 191), that is 2×96, and then resets. The line counter 34 has ten outputs which are connected to respective inputs of a programmable read-only memory (PROM) 35 having eight outputs which are respectively connected to the inputs of a write address buffer 36 and of a read address buffer 37. The PROM 35 converts the output of the line counter 34 to parallel 8-bit words representing line numbers in the range 0 to 95. Additionally, the two least significant stages of the sample counter 32 supply a 2-bit output to the read address buffer 37 for the purpose of identifying the position of each sample within a group of four samples in the line.

The actual arithmetical operations involved in shuffling and deshuffling the data in accordance with the above rules are carried out in the read address buffer 37 and the logic circuits 38, 39, 40 and 41, each of which has eight inputs respectively connected to eight outputs of the write address buffer 36 and to eight outputs of the read address buffer 37. Each of the logic circuits 38, 39, 40 and 41 also has eight outputs respectively connected to eight addressing inputs of the RAMs A, B, C and D respectively. Incidentally, in the apparatus of FIG. 3, each of the blocks marked with an asterisk can be formed as one integrated circuit.

To control reading and writing, a read/write signal is supplied to an input terminal 42 which is connected directly to an enable terminal of the write address buffer 36 and to respective control terminals of the logic circuits 38, 39, 40 and 41, and by way of an inverter 43 to an enable terminal of the read address buffer 37. In this way reading and writing are separated, so that one block of 96 lines is being assembled in the RAMs A, B, C and D while the preceding block of 96 lines is being read out. The total delay to the data is slightly greater than the duration of 96 lines.

The operation of the apparatus is such that during writing the shuffling is disabled. That is, the input samples are written into the RAMs A, B, C and D in cyclic rotation without line shuffling. This is indicated by the +0 below the bars in the logic circuits 38, 39, 40 and 41. On reading shuffling is effected in part by the read address buffer which multiplies the line number by 25 and adds 0, 24, 48, 72, 0, . . . to the line numbers of successive samples, and in part by the logic circuits 38, 39, 40 and 41 which add the line offsets of 0, 12, 6 and 18 respectively as indicated by the +0, +12, +6 and +18 above the bars.

The output data read from the stores A, B, C and D are therefore vertically shuffled as required, and it will be understood that vertical deshuffling is achieved in a generally similar way in the stores 15 and 16 of FIG. 1.

The operation of the vertical parity generator 10 of FIG. 1 will now be considered in more detail, indicating the interaction between the shuffling and the correction procedure. The vertical parity (V/P) used for correction is formed by the modulo-2 addition (exclusive OR) of sample words in the same horizontal position and spaced four lines apart throughout the block. Thus, for a 96-line block each vertical parity word is derived by the modulo-2 addition of twenty-four sample words, and the resulting vertical parity words add four lines to the block. This will more readily be understood by reference to Table 5 which for simplicity indicates a block of twelve lines instead of the 96-line block used in practice. The symbol $\oplus$ indicates the exclusive OR operation.

TABLE 5

| SAMPLE | | 0 | 1 | 2 | 3 | 4 | 5 | 6 | 7 | . |
|---|---|---|---|---|---|---|---|---|---|---|
| LINE | 0 | 0/0 | 0/1 | 0/2 | 0/3 | 0/4 | 0/5 | . | . | . |
| | 1 | 1/0 | 1/1 | ½ | ⅓ | . | . | . | . | . |
| | 2 | 2/0 | 2/1 | 2/2 | ⅔ | . | . | . | . | . |
| | 3 | 3/0 | 3/1 | 3/2 | . | . | . | . | . | . |
| | 4 | 4/0 | 4/1 | . | . | . | . | . | . | . |
| | 5 | 5/0 | . | . | . | . | . | . | . | . |
| | 6 | 6/0 | . | . | . | . | . | . | . | . |
| | 7 | 7/0 | . | . | . | . | . | . | . | . |
| | 8 | 8/0 | . | . | . | . | . | . | . | . |
| | 9 | 9/0 | . | . | . | . | . | . | . | . |
| | 10 | 10/0 | . | . | . | . | . | . | . | . |
| | 11 | 11/0 | | | | | | | | |
| V/P 1 | 12 | 12/0 | 12/1 | 12/2 | . | . | . | . | . | . |
| V/P 2 | 13 | 13/0 | 13/1 | . | . | . | . | . | . | . |
| V/P 3 | 14 | 14/0 | . | . | . | . | . | . | . | . |
| V/P 4 | 15 | 15/0 | . | . | . | | | | | |
| V/P 1 | (12/0) = | 0/0 | $\oplus$ | 4/0 | $\oplus$ | 8/0 | | | | |
| V/P 2 | (13/0) = | 1/0 | $\oplus$ | 5/0 | $\oplus$ | 9/0 | | | | |
| V/P 3 | (14/0) = | 2/0 | $\oplus$ | 6/0 | $\oplus$ | 10/0 | | | | |
| V/P 4 | (15/0) = | 3/0 | $\oplus$ | 7/0 | $\oplus$ | 11/0 | | | | |

As apparent from FIG. 1, the vertical parity generator 10 operates on the shuffled data. After replay, vertical parity words are generated in the same way by the vertical parity generator 13 from the reproduced shuffled data and compared with the reproduced vertical parity words. In the absence of errors they will be the same. However, as a separate operation, the error detector 12 detects words which are in error and if there is only a single sample word in error in any vertical parity group, the difference between the reproduced and the regenerated vertical parity words can be used to correct the sample word which is in error. To carry out these operations the data must be delayed by one 96-line block, but this delay occurs in any case in the vertical de-shuffling.

It is to be noted that most shuffling operations would have the effect of enchanging sample words in such a way that any error information accumulated before de-shuffling would be unusable after de-shuffling except at the price of great complexity. In the present case, however, any such complexity is avoided. First, this is because horizontal shuffling and de-shuffling is effected in the stores 3 and 4, and 20 and 21, wholly outside the correction circuits. Secondly, sample words within a given vertical parity group although displaced to different lines by the vertical shuffling, always remain within the same vertical parity group. For example, as seen in Table 3, the line 0 samples are in the lines 0, 24, 48, 72, . . . , and the line 4 samples are in the lines 4, 28, 52, 76, . . . . The maintenance of this relationship substantially reduces the complexity of the correction circuitry.

Various modifications are of course possible . For example, the invention can be applied to blocks of data with different numbers of lines and words per line, and to arrangements where the numbers of stores, the vertical line off-sets, and the successive line changes are different. Moreover, the invention is not limited to cases where the data represents a television signal.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of shuffling a block of data formed of data words, comprising the steps of receiving said block of data as a first sequence of data words, each data word having an original address representing the one of a plurality of original lines of data words making up said block in which each said respective data word is located and also the position of each said respective data word in said respective original line, each of said original lines having a number associated therewith, allocating to each said data word a new address by successively adding an identical number to the original line number of successive data words along each said original line while maintaining unchanged the position of said data word relative to other data words in the original line so that the address of said data word is changed from that representing said original line to that representing a new line, whereby said block of data is now made up of a plurality of new lines of data words; and transmitting said block of data as a second sequence of data words having said new addresses.

2. A method according to claim 1 further comprising the step of generating vertical parity words from said data words after said step of allocating.

3. A method of shuffling a block of data formed of 96 lines consecutively numbered from 0 to 95 and each line including 512 words consecutively numbered from 0 to 511 to addresses in first, second, third and fourth 96-line by 127-line word stores, the method comprising the steps of:

allocating the xth word in each line to one of the first, second, third and fourth stores in dependence on whether the residual on dividing x by four is one of zero, one, two and three, respectively;

consecutively numbering, in each line of each of the first, second, third and fourth stores, words supplied thereto from 0 to 126;

allocating, in the first store, the x'th word in each line to a new line $25y+24x'$;

allocating, in the second store, the x'th word in each line to a new line $6+25y+24x'$;

allocating, in the third store, the x'th word in each line to a new line $12+25y+24x'$; and allocating, in the fourth store, the x'th word in each line to a new line $18+25y+24x'$;

where in each case y is the original line number and the addition in each respective step of allocating is modulo-96.

4. A method according to claim 3 wherein each of said lines represent horizontal scan lines of a television signal and each of said words represent video signal samples.

5. A method according to claim 4 further comprising a preliminary shuffling step including the step of shuffling the order of said words in each said line.

6. A method according to claim 3 further comprising the step of generating four vertical parity words for each line position including the step of exclusive OR adding of all the data words in that line position in respective groups of said lines, each group including every fourth line starting with the lines 0, 1, 2 and 3 respectively.

7. Apparatus for shuffling a block of data formed of data words, comprising means for receiving said block of data as a first sequence of data words, each data word having an original address representing the one of a plurality of original lines of data words making up said block in which each said respective data word is located and also the position of each said respective data word in said respective original line, each original line having a number associated therewith, means associated with said means for receiving for allocating to each said data word a new address in which the line of the original address at which said data word is positioned is changed to a new line by successively adding an identical number to the original line number of successive data words along each said original while maintaining the position of said data word relative to other data words in the original line unchanged, whereby said block of data is now made up of a plurality of new lines of data words; and means for transmitting said block of data in a second sequence of data words having said new addresses.

8. Apparatus for shuffling a block of data formed of 96 lines consecutively numbered from 0 to 95 and each line including 512 words consecutively numbered from 0 to 511, the apparatus comprising first, second, third and fourth 96-line by 127-line word stores for receiving said block of data in a first sequence in correspondence with said consecutively numbered lines;

means for storing the x'th word in each line in one of the first, second, third and fourth stores in dependence on whether the residual on dividing x by four is one of zero, one, two and three, respectively;

in each line of each of the first, second, third and fourth stores, incoming words being numbered consecutively from 0 to 126;

means associated with the first store for allocating the x'th word in each line to a new line $25y+24x'$;

means associated with the second store for allocating the x'th word in each line to a new line $6+25y+24x'$;

means associated with the third store for allocating the x'th word in each line to a new line $12+25y+24x'$; and means associated with the fourth store allocating the x'th word in each line to a new line $18+25y+24x'$;

wherein in each case y is the original line number and the addition by each respective means for allocating is modulo-96; and means for transmitting said block of data from said stores in a second sequence in correspondence with said consecutively numbered lines.

9. Apparatus according to claim 8 wherein each of said lines represent horizontal scan lines of a television signal and each of said words represent video signal samples.

10. Apparatus according to claim 8 further comprising means for effecting a preliminary shuffling in which the order of said words in each said original line is reordered, and for transmitting said reordered words to said means for receiving.

11. Apparatus according to claim 8 further comprising means for receiving said block of data in said second sequence from said stores and for generating four vertical parity words for each line position by the exclusive OR addition of all the data words in that line position in respective groups of said lines, each group including every fourth line starting with the lines 0, 1, 2 and 3, respectively.

* * * * *